United States Patent
Chapa

(10) Patent No.: US 8,640,487 B2
(45) Date of Patent: Feb. 4, 2014

(54) REFREEZABLE CONTAINER

(76) Inventor: Adan Francisco Chapa, Houston, TX (US)

( * ) Notice: Subject to any disclaimer, the term of this patent is extended or adjusted under 35 U.S.C. 154(b) by 1185 days.

(21) Appl. No.: 12/499,130

(22) Filed: Jul. 8, 2009

(65) Prior Publication Data

US 2011/0005240 A1    Jan. 13, 2011

(51) Int. Cl.
*F25D 3/08* (2006.01)
*B65B 63/08* (2006.01)
*B65D 21/00* (2006.01)

(52) U.S. Cl.
USPC ............. 62/457.2; 62/457.6; 62/60; 206/508; 206/509; 206/504; 220/23.6

(58) Field of Classification Search
USPC .................... 62/457.2, 60, 371, 457.1, 457.6; 206/503, 504, 508, 509; 220/23.6
See application file for complete search history.

(56) References Cited

U.S. PATENT DOCUMENTS

| | | | | |
|---|---|---|---|---|
| 5,769,229 | A * | 6/1998 | Andress et al. | 206/505 |
| 6,062,040 | A * | 5/2000 | Bostic et al. | 62/530 |
| 6,761,041 | B2 * | 7/2004 | Roth et al. | 62/457.2 |
| 2006/0037883 | A1 * | 2/2006 | Stagnetto | 206/509 |
| 2007/0187277 | A1 * | 8/2007 | Furlong | 206/515 |

* cited by examiner

*Primary Examiner* — Frantz Jules
*Assistant Examiner* — Cassey D Bauer
(74) *Attorney, Agent, or Firm* — Matthews Lawson, PLLC

(57) ABSTRACT

A refreezable container for storage of perishable and/or temperature-sensitive items is described herein. A bottom surface, contiguous with one or more side surfaces is provided, each surface having an interior cavity at least partially filled with refreezable material, usable to retain contents within the container at a temperature less than ambient temperature. The bottom surface includes a lower groove therein. The side surfaces include a lip adapted for secure engagement for an upper object, which can include a top cover having a complementary groove, or the lower groove of an adjacent refreezable container, allowing multiple containers, with or without top covers, to be nested for storage or transport, and allowing multiple covered containers, or top covers independent of containers, to be stacked and nested.

12 Claims, 3 Drawing Sheets

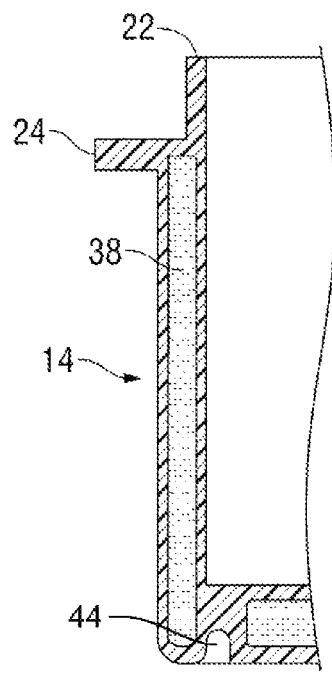
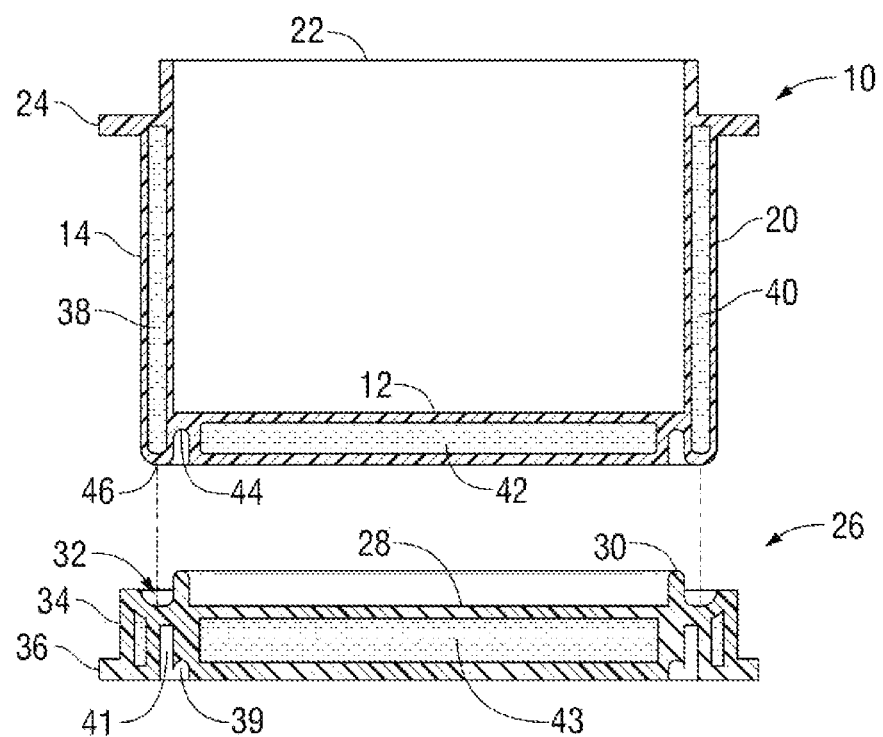

REFREEZABLE CONTAINER

FIELD

The present invention relates generally, to a refreezable container usable for maintaining contents at a temperature less than the ambient temperature to facilitate storage and/or transport of temperature-sensitive and/or perishable items.

BACKGROUND

When transporting perishable or temperature-sensitive items for personal or industrial purposes or when undertaking short-term or long-term storage of such items, some type of cooling or refrigeration apparatus is normally used to retain the items at a desired temperature. For example, milk, ice cream, cheese, meats, and similar perishable food items are normally transported long distances using refrigerated trucks or similar vehicles, and are then maintained in refrigerated areas of a store until sale. In situations where use of a refrigerated vehicle or storage area is impractical or unnecessary, various temperature-sensitive items can be transported inside an insulated, temperature-regulated container accompanied by a refrigerant such as dry ice. Typically, use of refrigerants and sophisticated vehicles and/or containers is economically prohibitive, except for large-scale use, and even in such instances, technologically advanced systems are prone to damage or malfunction.

When transporting or storing temperature-sensitive items for personal use, such as when packaging perishable food items for lunch at work or school, during travel, or for a picnic or other recreational event, it is common to use technologically simpler means to maintain the temperature of the perishable items until use. The most common objects utilized for such a purpose include insulated coolers within which the objects are placed, such that the walls and lid of the cooler prevent the transfer of heat between the ambient environment and the interior of the cooler. When longer-term storage is desired, reusable, sealed packages containing a freezable substance can be placed in a freezer until the substance is frozen, then placed inside the cooler to maintain the cooler's interior at a desired temperature! until the freezable substance has melted. Combined with the insulating properties of the cooler, use of one or more packages of frozen material placed among the contents can maintain a favorable temperature within the cooler for several hours or more, however the temperature maintenance provided by discrete packages of frozen materials within a container is often uneven, the largest benefit being provided to objects immediately adjacent to the frozen material, while other contents may become warmer than desired.

While conventional use of sealed containers of frozen material is generally an effective method for maintaining the temperature within a cooler for short-term storage and/or transport of items, this method presents several undesirable drawbacks. Most notably, sealed packages of freezable material occupy space within the interior of a cooler or similar insulated container which reduces the available space within the container for storing items. Additionally, as a package of freezable material begins to warm while cooling the interior of a container, condensation can form on the exterior of the package, dampening the contents of the container. Further, as described above, discreet packages of freezable material are restricted to occupying a single defined space within a container, thereby providing an uneven distribution of temperature throughout the container's interior. Objects proximate to the freezable material may become extremely cold, and can possibly be chilled beyond a desirable temperature range, while objects elsewhere within a container may not benefit significantly from the presence of the freezable material.

One method by which some of these drawbacks have been overcome has included the placement of packages of freezable material, or unpackaged freezable material and/or phase-change material, within the walls of a container, sandwiched between sealed or attached layers. The entire container is placed in a freezer to freeze the sandwiched freezable material, at which point temperature-sensitive items can be placed within the container, in direct contact with the interior surfaces of the container to ensure adequate temperature regulation. However, these multi-layer containers can become worn and begin to leak materials contained within the walls especially at the points of attachment between separable parts or along sealed areas. Additionally, over time, material contained between the wall layers of such a container has a tendency to settle toward the container's base, mitigating the effectiveness of the container due to uneven distribution of freezable material and/or places within the container where such material is lacking entirely. Further, many such containers include multiple interlocking parts, hinges and similar moving and/or removable parts that are prone to damage or leakage after an extended period of use.

A need exists for a refreezable container that captures the advantages of direct contact between a cooling medium and the container's contents, while remaining simple in design and construction, thereby minimizing the potential for damage or leakage.

A need exists for a refreezable container that can be provided with unique and non-standard shapes, including bowl shapes and cylindrical shapes, for containing items not normally transportable in a temperature-regulated container, such as liquids and gels.

A further need exists for a refreezable container having a discrete cavity within each surface to contain refreezable material, prevent significant settling, and ensure that the refreezable material remains in a suitable position to substantially enclose the container.

A need also exists for a refreezable container having enhanced storage and nesting features to facilitate transport and storage of multiple containers while occupying a minimum amount of necessary space.

The present invention meets these needs.

SUMMARY

In a preferred embodiment of the present invention a refreezable container is provided having a bottom surface and at least one side surface contiguous with the bottom surface such that the refreezable container is a one-piece construction. Formation of the refreezable container from a single, contiguous piece eliminates the potential for damage or leakage of refreezable material at points of attachment or along seals between layers.

The bottom surface and all side surfaces of the container are each provided with a single interior cavity, which is at least partially filled with a refreezable material. Usable refreezable materials can include polymer gels, such as Blue Ice™ or similar materials, reusable ice, or any other material able to be frozen multiple times without degrading. Typically, the interior cavities within each surface can be sized to include a sufficient quantity of empty space to permit the expansion of the refreezable material when frozen without damaging the structure of the container.

While the refreezable container can be formed from any generally rigid, durable material that retains its general shape in both freezing and ambient temperatures, such as rubber, plastic, Plexi-Glas™, or metal in an embodiment of the invention, the container can be formed from a durable plastic. In further embodiments of the invention, the plastic can be at least partially transparent, enabling refreezable material within the surfaces of the container and/or the contents of the container to be visualized. The refreezable material within one or more of the cavities can be provided with one or more selected colors, such as an individual's favorite colors, the colors of a sports team offering the container for sale, colors representative of a university, or other similar applications containing one or more colors. One or more additional materials, such as glitter or a similar reflective material, could be contained within the refreezable material to further add a unique appearance to the container. Use of colored refreezable material and/or additional materials is beneficial not only for aesthetically personalizing a container, but also for differentiating between multiple containers used to contain different types of items or items belonging to different individuals.

In an embodiment of the invention the bottom surface and side surfaces of the container can define a cubic or rectangular prismatic shape, however it should be noted that other non-standard shapes can also be provided, such as a cylindrical shape or a bowl shape. Use of a container having a non-standard shape enables the present refreezable container to store and transport items that are not normally able to be contained in a conventional cooler, without requiring separate packaging for such items, such as unpackaged ice cream, Jell-o™, yogurt, potato salad, coleslaw, or other unpackaged liquids, gels, emulsions, or similar mixtures. The present refreezable container can have any desired shape and any dimensions. For example, numerous small cubical and/or bowl-shaped refreezable containers could be used to contain individual perishable food items and placed within a conventional lunch container. A somewhat larger, rectangular refreezable container could be used as a lunch box, while a refreezable container approaching the size of a conventional cooler could be used to transport supplies for a picnic. Multiple, cubical containers could be used for transport of perishable items, such as one or more gallons of milk, in lieu of a refrigerated vehicle, thereby enabling a conventional truck to be used to transport temperature-sensitive items, in combination with other items that can be loaded external to the containers during transport. The present refreezable container can also be sized and shaped to accommodate various specialty uses unrelated to the transport of food such as the storage and/or transport of temperature-sensitive medications or organs for transplant.

The side surfaces of the refreezable container include a lip formed about the top of the container, the lip being configured for secure engagement with a lid or similar top cover. In typical use, a top cover can be provided having a lower groove adapted to securely engage the lip. The top cover can have an interior cavity within, at least partially filled with refreezable material, thereby enabling contents within the container to be completely enclosed by refreezable material on all sides. The top cover can also include a flange, which abuts against a similar flange protruding from the side surfaces of the container, to form an enhanced engagement.

As depicted in FIG. 3C, to facilitate storage of multiple refreezable containers during periods of non-use, the base of the present refreezable container can be sized to partially fit within a second, similar container, enabling multiple refreezable containers to be nested in a space-saving arrangement for storage. Similarly, in a preferred embodiment top covers can be configured to stack or nest within one another.

In a further, preferred embodiment of the invention, the bottom surface of the refreezable container can include a groove adapted to engage a lower adjacent object, which can include a top cover secured over a second refreezable container. The top cover can include an upper ridge adapted to engage adjacent objects, which can include the lower groove disposed within the bottom of an adjacent refreezable container or within another top cover. In this manner, multiple refreezable containers can be vertically stacked during storage and/or transport. Additionally, multiple top covers can be stacked through engagement between adjacent ridges and grooves, facilitating storage of the top covers when not in use.

In an alternate embodiment of the invention the base of the refreezable container can be sized such that the lower groove can engage the lip of a lower adjacent container, enabling multiple containers to be stacked and nested without requiring a lid the base surface of an upper container functioning as both a base and as a top cover for the container below.

In use, one or more refreezable containers having a desired shape and dimensions are provided and are cooled until the refreezable material contained within the base and side surfaces of each container reaches a selected temperature. During typical operation, the refreezable containers can be placed in a freezer or similar apparatus until the refreezable material has frozen. Contents are then placed within the one or more containers in contact with the interior of the base and/or side surfaces. Selectively, one or more top covers can be engaged with the containers. Additionally, the base surface of an upper container can be engaged with the top cover of an adjacent lower container to facilitate storage and/or transport and to enhance the effectiveness of each container by surrounding the containers with other frozen containers.

When no longer in use, the containers can then be vertically nested with one another, while any top covers can be stacked in a nesting engagement separately from the containers for easy storage. As described previously, in a preferred embodiment of the invention, the containers can be sized to at least partially fit within one another to facilitate nesting and storage.

An embodiment of the invention can include a temperature indicator, such as a thermometer, disposed through one of the surfaces of the container, to enable monitoring of the temperature of the interior. In a further embodiment of the invention, the refreezable material and/or a portion of the container can be adapted to indicate the temperature of the interior, such as by changing color responsive to temperature.

The present invention thereby provides a refreezable container that is simple in use and design, thereby avoiding the drawbacks relating to damage and settling of refreezable material present during use of other containers. The present refreezable container can be stacked vertically and/or horizontally with other containers for convenient and efficient storage, with this feature providing the dual benefit of enclosing contents with refreezable material on all sides and enhancing the cooling ability of each container due to the presence of adjacent frozen containers.

The present invention is thereby of great utility and benefit to laborers, students, travelers and similar individuals who seek to transport food, medicines, or other perishable and/or temperature-sensitive items. By eliminating the need for separate packages containing freezable material, the present refreezable container saves time and costs, avoids the inconvenience of lost or damaged packages of freezable material, does not require consumption of interior space within the container by the freezable material, and cools contents of the container more efficiently than conventional means through direct contact between the walls and base of the container and the items to be cooled.

Use of the present refreezable container, which includes refreezable material within each base and side surface, disposed within discreet internal cavities, maintains the temperature of the container below the ambient temperature for longer than conventional use of separate packages of frozen material. Use of refreezable gel-filled covers and the nesting/stacking feature of the present refreezable container further enhances the duration with which the contents of a container can be maintained at a selected temperature by enclosing the contents with multiple layers of refreezable material on multiple sides through adjacent frozen containers in close proximity.

The differing shapes and dimensions with which the present refreezable container can be provided enable the present invention to be applied to a large variety of purposes, including but not limited to storage of lunches during the workday or school day, transport of cold and/or frozen groceries between errands or to locations remote from the grocery store, transport and/or storage of picnic supplies or foods during travel, transport of temperature-sensitive medications, small or large-scale shipment of perishable or temperature-sensitive products, and numerous other similar purposes. Further, unique shapes with which the present refreezable container can be provided enable the present invention to store and transport unpackaged liquids and other amorphous items. For example, an embodiment of the present invention having the shape of a bowl could be used to transport a serving of ice cream within a lunch container.

The present refreezable container can further be personalized as well as differentiated from other containers when formed from a selectively transparent or translucent material with selectively colored refreezable material and/or additional materials contained within the refreezable material. Through use of this embodiment of the present invention, items of differing types or items intended for different individuals can be readily ascertained without requiring containers to be separately marked or labeled.

The present invention thereby provides numerous advantages not currently available to consumers both for personal and industrial uses while overcoming various drawbacks of existing containers. Other benefits and features of the present refreezable container and methods of use are described herein.

BRIEF DESCRIPTION OF THE DRAWINGS

In the detailed description of the embodiments of the invention presented below, reference is made to the accompanying drawings, in which:

FIG. 3 depicts a side cross-sectional view of a side surface of the refreezable container of FIG. 1.

FIG. 4 depicts a cross sectional view of the refreezable container of FIG. 1 in a nesting engagement with the top cover of FIG. 2.

The depicted embodiments of the invention are described below with reference to the listed Figures.

DETAILED DESCRIPTION OF THE EMBODIMENTS

Before explaining the present embodiments in detail, it is to be understood that the embodiments are not limited to the particular descriptions and that the embodiments can be practiced or carried out in various ways.

Figure 1:
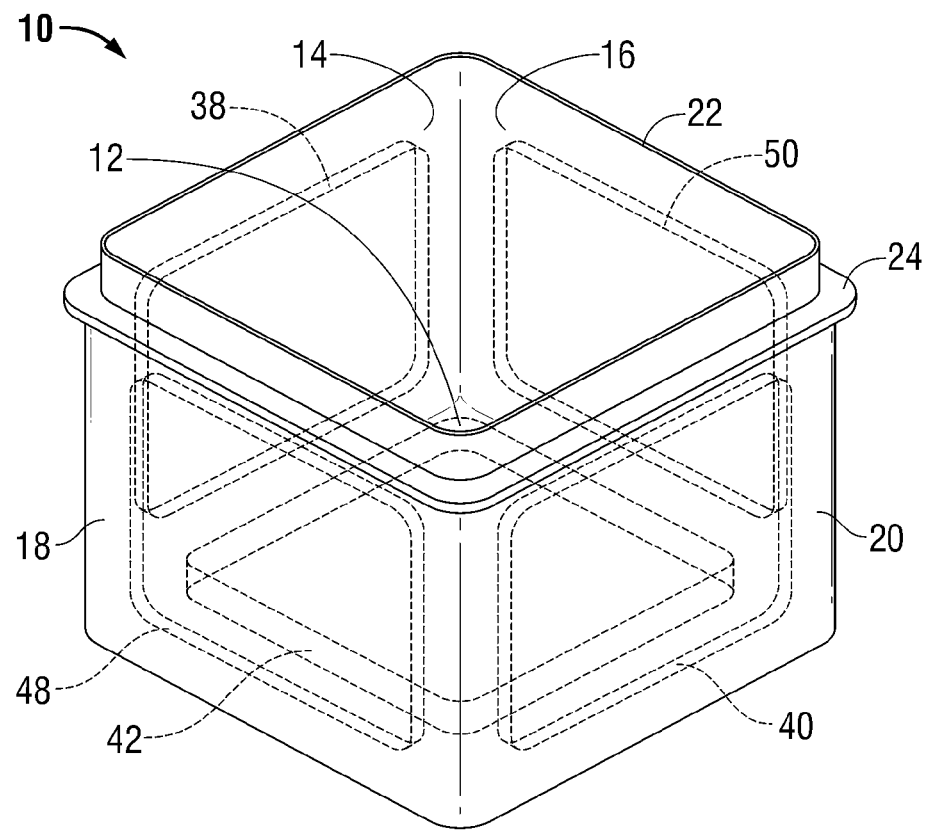
FIG. 1 depicts a perspective view of an embodiment of the present refreezable container.

Referring now to FIG. 1, a perspective view of an embodiment of the present refreezable container is depicted. The refreezable container (10) is shown having a base surface (12), and four side surfaces (14, 16, 18, 20) contiguous with the base surface (12), defining a box shape for containing items. It should be noted that while the depicted refreezable container (10) has a generally cubical shape, containers having other shapes are also usable within the scope of the invention. For example, the base surface could have a round shape, while the side surface(s) extend upward, defining a container having a cylindrical shape. Similarly, the base surface could have a round or concave shape, while the side surface(s) extend upward in a hemispherical shape, defining a container having the shape of a bowl.

The base surface (12) and the side surfaces (14, 16, 18, 20) are shown connected in a seamless, contiguous manner, as a one-piece construction lacking attachment points, connectors, or sealing members between surfaces. This contiguous construction enables the present refreezable container (10) to be efficiently and inexpensively constructed such as through a basic molding process, to produce a rigid container having a selected and predictable size and shape, while minimizing the potential for damage or leakage of refreezable material from the surfaces (12, 14, 16, 18, 20) at points of attachment or along seals.

In an embodiment of the invention, the base surface (12) and side surfaces (14, 16, 18, 20) can be formed from a durable plastic, however it should be understood that the present refreezable container (10) can be formed from any generally rigid material able to withstand ambient and cold temperatures without warping or losing structural integrity. The material of any of the surfaces (12, 14, 16, 18, 20) can be partially or wholly transparent or translucent to permit visualization of the refreezable material or other materials contained within the surfaces, which can be selectively colored or otherwise decorated for aesthetic reasons and/or to readily enable differentiation between multiple containers. Each of the surfaces (12, 14, 16, 18, 20) contains an individual, discrete cavity (42, 38, 50, 48, and 40, respectively) at least partially filled with refreezable material.

Along the top of the side surfaces (14, 16, 18, 20), a lip (22) is defined, which is sized for engagement with a complementary groove within the base of a cover. The side surfaces are further shown having a flange (24) protruding therefrom, proximate to the lip (22), the flange being sized and positioned to abut with a corresponding flange on a cover, thereby enhancing the effectiveness of the enclosure provided by covering the top of the refreezable container (10). In an embodiment of the invention, abutment between the flange (24) and an adjacent surface can provide a substantially airtight engagement.

Figure 2:
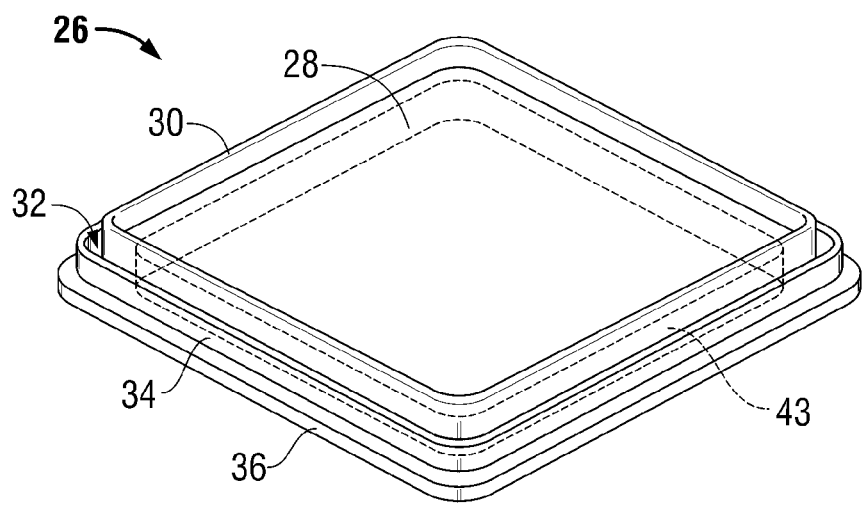
FIG. 2 depicts a perspective view of an embodiment of a top cover usable with the present refreezable container.

Referring now to FIG. 2, a perspective view of an embodiment a top cover, usable for engagement with the refreezable container of FIG. 1, is depicted.

The top cover (26) is shown having a generally flat top surface (28) contiguous with a side portion (34), defining a generally flat, square shape. It should be noted that the shape and dimensions of the top cover (26) can vary depending on the shape and dimensions of the refreezable container to be enclosed. The top cover can be formed from any generally rigid, durable material similar to those usable to form the refreezable container. Similar to the side and base surfaces of the refreezable container (depicted in FIG. 1), the top cover (26) can include an interior cavity (43) at least partially filled with refreezable material.

A ridge (30) is shown protruding from the top surface (28) proximate to the perimeter of the top cover (26), the ridge (30) being sized and positioned to engage a corresponding groove within the base of a second refreezable container, for enabling stacking of covered containers, or to engage a corresponding groove within the bottom of a second top cover to enable stacking and storage of covers. The positioning, of the ridge (30) defines a groove (32) between the ridge (30) and the perimeter of the top cover (26), the groove (32) being sized and positioned for engagement with a protruding portion of a second refreezable container or top cover in a similar manner, thereby forming an overlapping engagement between the top cover (26) and adjacent objects.

The top cover (26) is shown having an upper flange (36) protruding from the side portion (34). The upper flange (36) is sized and positioned to abut against a corresponding flange of a refreezable container when the top cover (26) is engaged therewith, enhancing the effectiveness of the enclosure provided to the refreezable container. In an embodiment of the invention, abutment between the upper flange (36) and a corresponding flange of the refreezable container can form a substantially airtight engagement. Referring now to FIG. 3, a cross-sectional view of a side surface of the refreezable container of FIG. 1 is shown.

While FIG. 3 depicts only the first side surface (14) of the refreezable container, it should be noted that other side surfaces can be of identical or similar construction as the depicted side surface (14). Further, while FIG. 3 depicts the first side surface (14) independent from other portions of the refreezable container, it should be understood that the refreezable container is preferably formed from a single, contiguous piece. The side surface (14) is shown having a lip (22) and a flange (24) as described previously. The depicted side surface (14) is further shown having an interior cavity (38), which is at least partially filled with a refreezable material. Usable refreezable materials can include polymer gels, such as Blue Ice™ or similar reusable ice and/or gels, or any other material able to be frozen multiple times without degrading. The quantity of refreezable material within the interior cavity (38) can vary depending on the intended use of the container, however sufficient empty space within the interior cavity (38) can be retained to permit expansion of the refreezable material when frozen.

The shape and dimensions of the interior cavity (38) can vary depending on the shape and dimensions of the side surface (14), the dimensions of the refreezable container, and tie intended purpose of the container. For example, a container intended for ground transport, requiring substantial durability, may have thicker walls and a smaller interior cavity, while a container intended for long-term storage could have a larger interior cavity for containing a greater quantity of refreezable material, providing prolonged storage capabilities to the container.

Referring now to FIG. 4, a cross sectional view of the refreezable container of FIG. 1 is shown in a nesting or stacked engagement with the top cover of FIG. 2.

The two side surfaces (14, 20) of the refreezable container (10) are visible, the first side surface (14) having a first interior cavity (38) disposed therein, and the second side su-face (20) having a second interior cavity (40) disposed therein. Each interior cavity (38, 40) is at least partially filled with refreezable material. The base surface (12) is also shown, having a third interior cavity (42) disposed therein, also at least partially filled with refreezable material.

The base surface (12) is shown having a lower groove (44) disposed therein, which can extend proximate to the perimeter of the base surface (12), the lower groove (44) being sized for engagement with the ridge (30) disposed on the top cover (26). The lower groove (44) and the ridge (30) are each shown having a generally U-shaped profile, however other shapes are also usable. The position of the lower groove (44) along the base surface (12) defines a lower ridge (46) along the exterior of the base surface (12), which engages the groove (32) disposed adjacent to the ridge (30) of the top cover (26).

The top cover (26) is shown having a top interior cavity (43) at least partially filled with refreezable material. The top cover (26) has an outer bottom groove (41) which extends proximate to the perimeter of the lower side of the top cover (26), for engagement with the lip of a refreezable container, as described previously. The top cover (26) is further shown having an inner bottom groove (39) for engagement with the upper ridge of another top cover for stacking and storage. The top cover (26) is also shown having the side portion (34) with the upper flange (36) protruding therefrom.

Figure 5:
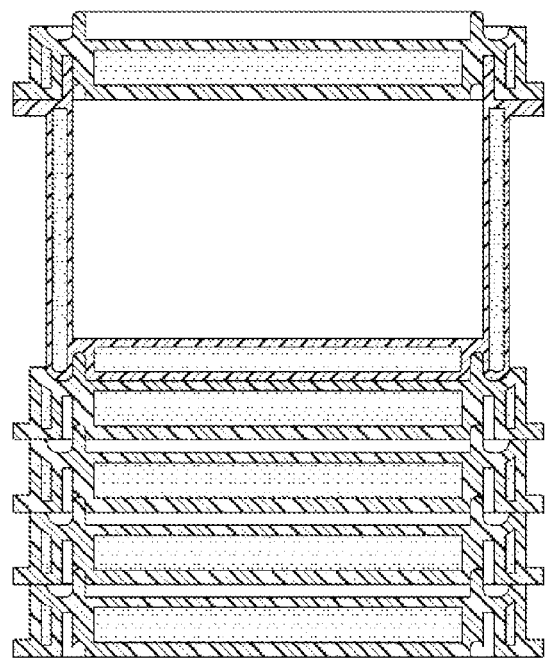
FIG. 5 depicts an assembled cross-sectional view of an embodiment of the present refreezable container and multiple top covers.

Referring now to FIG. 5, an assembled cross-sectional view of an embodiment of the present refreezable container is shown, having a top cover disposed thereon, and multiple stacked top covers below, depicting the interactions and engagements between the grooves and ridges, described above.

Figure 6:
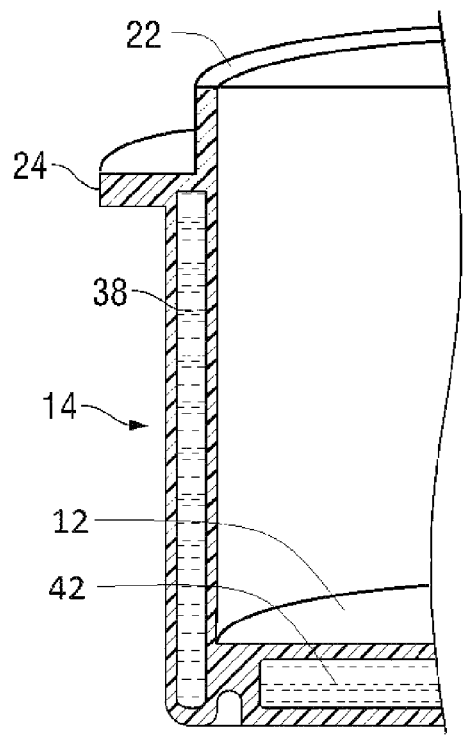
FIG. 6 depicts a cross sectional view of a refreezable container having a cylindrical shape.

FIG. 6 depicts a cross sectional view of an embodiment of the refreezable container having a cylindrical shape. The container comprises a single side surface (14) and a single interior cavity (38), each having a cylindrical shape, as well as a base surface (12) and a bottom interior cavity (42).

The refreezable container, depicted and described throughout, while a non-limiting embodiment of the present invention, provides for a one-piece construction that is simple in design and use which can be enclosed with top covers and nested, or stacked, with adjacent containers, thereby providing a flexible and efficient system for storage and/or transport of perishable or temperature-sensitive items. Other advantages and embodiments of the present refreezable container and methods of use are described throughout the above disclosure and the claims below.

While the present invention has been described with emphasis on certain embodiments it should be understood that within the scope of the appended claims, the present invention can be practiced other than as specifically described herein.

What is claimed is:
1. A refreezable container comprising:
   a bottom surface comprising a bottom interior cavity and a lower ridge and a lower groove, wherein said lower ridge and said lower groove are adapted for engagement with a lower adjacent object, wherein the bottom interior cavity is at least partially filled with refreezable material;
   at least one side surface contiguous with the bottom surface, wherein each at least one side surface comprises a side interior cavity separate from the bottom interior cavity and a top comprising a lip adapted for secure engagement with an upper adjacent object, and wherein the side interior cavity is at least partially filled with refreezable material, such that when the refreezable container is cooled, the refreezable material within the cavi- ties retains contents of the refreezable container at a temperature lower than ambient temperature; and a top cover having a side cover surface, wherein the top cover comprises a lower cover groove adapted for secure engagement with the lip of the at least one side surface, an upper cover groove adapted for secure engagement with the lower ridge, and an upper cover ridge adapted for secure engagement with the lower groove, wherein the upper cover groove is positioned between the upper cover ridge and the side cover surface, and wherein the top cover comprises an upper interior cavity at least partially filled with refreezable material for enclosing contents of the refreezable container with refreezable material, wherein the lower groove of the bottom surface is adapted to engage the upper cover ridge of an adjacent top cover engaged with an adjacent refreezable container, thereby enabling multiple refreezable containers having top covers securely engaged thereon to be stacked for storage or transport or to provide additional refreezable material between the refreezable containers, and wherein the lower cover groove of the top cover is adapted to engage the upper cover ridge of the adjacent top cover, thereby enabling multiple top covers to be stacked for storage or transport or to provide additional refreezable material between the refreezable containers.

2. The refreezable container of claim 1, wherein the bottom surface, the at least one side surface, or combinations thereof are configured for entry within the adjacent refreezable container, and wherein the refreezable container and the adjacent refreezable container are substantially the same size, thereby enabling multiple refreezable containers to be nested for storage.

3. The refreezable container of claim 1, wherein the bottom surface and the at least one side surface define a cylindrical shape, a cubical prismatic shape, or a rectangular prismatic shape.

4. The refreezable container of claim 1, wherein the bottom surface and the at least one side surface define a bowl shape.

5. The refreezable container of claim 1, wherein the refreezable material comprises a gel material.

6. The refreezable container of claim 1, wherein the bottom surface, the at least one side surface, or combinations thereof, are at least partially transparent for enabling visualization of the refreezable material.

7. The refreezable container of claim 1, wherein the refreezable material comprises a selected color, a selected additional material, or combinations thereof, for visualization through transparent surfaces.

8. The refreezable container of claim 1, wherein the bottom interior cavity and the side interior cavity comprise a space sized to enable expansion of refreezable material when the refreezable material freezes.

9. The refreezable container of claim 1, wherein the at least one side surface comprises a first flange, wherein the top cover comprises a second flange, and wherein engagement between the at least one side surface and the top cover causes the first flange and the second flange to abut.

10. The refreezable container of claim 1, further comprising a temperature indicator for indicating the temperature of an interior of the refreezable container.

11. The refreezable container of claim 1, wherein the refreezable material comprises a material that changes color responsive to temperature.

12. The refreezable container of claim 1, wherein an upper boundary of the lower cover groove is located below a lower boundary of the upper cover ridge.

* * * * *

UNITED STATES PATENT AND TRADEMARK OFFICE
CERTIFICATE OF CORRECTION

PATENT NO.          : 8,640,487 B2                                                     Page 1 of 1
APPLICATION NO.     : 12/499130
DATED               : February 4, 2014
INVENTOR(S)         : Adan Francisco Chapa It is certified that error appears in the above-identified patent and that said Letters Patent is hereby corrected as shown below:

In the Specification

Column 1, line 42, the symbol "!" should be changed to --,--.
Column 3, line 61, the text "As depicted in FIG. 3C" should be changed to --In a preferred embodiment of the invention--.
Column 4, line 5, the word "covet" should be changed to --cover--.
Column 7, line 55, the word "tie" should be changed to --the--; Column 7, line 67, the word "su-face" should be changed to --surface--.

Signed and Sealed this
Second Day of September, 2014

Michelle K. Lee
*Deputy Director of the United States Patent and Trademark Office*